(12) United States Patent
Hämmerle et al.

(10) Patent No.: US 8,690,270 B2
(45) Date of Patent: Apr. 8, 2014

(54) ROLLING BODY OF A MOVING CARRIAGE CAGE FOR DRAWER GUIDES

(71) Applicant: Julius Blum GmbH, Höchst (AT)

(72) Inventors: Hermann Hämmerle, Lustenau (AT); Albert Bösch, Gaißau (AT)

(73) Assignee: Julius Blum GmbH, Höchst (AT)

( * ) Notice: Subject to any disclaimer, the term of this patent is extended or adjusted under 35 U.S.C. 154(b) by 0 days.

(21) Appl. No.: 13/683,251

(22) Filed: Nov. 21, 2012

(65) Prior Publication Data

US 2013/0076221 A1  Mar. 28, 2013

Related U.S. Application Data

(63) Continuation of application No. PCT/AT2011/000147, filed on Mar. 24, 2011.

(30) Foreign Application Priority Data

May 25, 2010 (AT) .................................. A 849/2010

(51) Int. Cl.
*A47B 88/00* (2006.01)

(52) U.S. Cl.
USPC .................................. 312/334.13; 312/334.6

(58) Field of Classification Search
USPC ............ 312/334.15–334.19, 334.21, 334.25, 312/334.26, 334.33, 334.36–334.39, 312/334.41–334.43, 334.9–334.13; 428/217, 377, 394, 395, 393; 384/18, 384/19, 23, 50
See application file for complete search history.

(56) References Cited

U.S. PATENT DOCUMENTS

| | | | | |
|---|---|---|---|---|
| 1,833,461 A | * | 11/1931 | Grupe | 492/28 |
| 3,194,610 A | * | 7/1965 | Stewart | 384/19 |
| 3,215,476 A | * | 11/1965 | Jacobs | 384/19 |
| 3,646,652 A | * | 3/1972 | Heiligenthal et al. | 492/53 |
| 3,774,983 A | * | 11/1973 | Lagally | 384/280 |
| 4,057,303 A | * | 11/1977 | Rock et al. | 384/19 |
| 4,226,490 A | * | 10/1980 | Jenkins et al. | 312/331 |
| 4,305,625 A | * | 12/1981 | Gutner et al. | 384/19 |
| 4,659,237 A | * | 4/1987 | Rapp | 384/19 |

(Continued)

FOREIGN PATENT DOCUMENTS

| | | |
|---|---|---|
| AT | 317 473 | 8/1974 |
| AT | 367 989 | 8/1982 |

(Continued)

OTHER PUBLICATIONS

International Search Report issued May 27, 2011 in International (PCT) Application No. PCT/AT2011/000147.

(Continued)

*Primary Examiner* — Janet M Wilkens
(74) *Attorney, Agent, or Firm* — Wenderoth, Lind & Ponack, L.L.P.

(57) ABSTRACT

A rolling body of a moving carriage cage for drawer guides has an internal core part and a separate casing part surrounding the core part. The core part is preferably composed of a first plastic, and the casing part is preferably composed of a second plastic. The plastics of the core part and of the casing part have different indentation hardnesses.

22 Claims, 7 Drawing Sheets

(56) References Cited

U.S. PATENT DOCUMENTS

| | | | | |
|---|---|---|---|---|
| 4,979,262 A | * | 12/1990 | Lautenschlager | 16/97 |
| 5,090,820 A | | 2/1992 | Lautenschläger | |
| 5,322,735 A | * | 6/1994 | Fridez et al. | 428/357 |
| 6,444,065 B1 | * | 9/2002 | Reil et al. | 156/86 |
| 6,655,845 B1 | * | 12/2003 | Pope et al. | 384/492 |
| 6,805,762 B2 | * | 10/2004 | Narita et al. | 156/86 |
| 7,866,772 B1 | * | 1/2011 | Chen | 312/334.9 |
| 2006/0091770 A1 | | 5/2006 | Ritter et al. | |
| 2007/0057608 A1 | * | 3/2007 | Chiu | 312/334.1 |
| 2008/0258592 A1 | | 10/2008 | Blum | |

FOREIGN PATENT DOCUMENTS

| | | |
|---|---|---|
| DE | 24 61 341 | 7/1976 |
| DE | 26 02 979 | 7/1977 |
| DE | 39 22 716 | 1/1991 |
| DE | 41 08 884 | 10/1991 |
| DE | 41 04 271 | 8/1992 |
| DE | 103 17 311 | 11/2004 |
| DE | 10 2005 050 3 | 5/2006 |
| DE | 20 2007 011 3 | 10/2007 |
| EP | 0 439 774 | 8/1991 |
| EP | 1 407 691 | 4/2004 |
| EP | 1 470 770 | 10/2004 |
| EP | 1 967 094 | 9/2008 |
| JP | 60-196432 | 10/1985 |
| WO | 2007/065180 | 6/2007 |
| WO | 2008/046118 | 4/2008 |

OTHER PUBLICATIONS

Austrian Patent Office Search Report issued Feb. 8, 2011 in Austrian Patent Application No. A 849/2010.

* cited by examiner

Fig. 1 STATE OF THE ART

ROLLING BODY OF A MOVING CARRIAGE CAGE FOR DRAWER GUIDES

BACKGROUND OF THE INVENTION (1) Field of the Invention

The invention concerns a rolling body of a carriage cage for drawer guides. The invention further concerns a carriage cage for a drawer guide having such rolling bodies as well as a drawer guide having a carriage cage and an article of furniture having a drawer guide.

(2) State of the Prior Art

Rolling bodies of that kind serve essentially for the transmission of kinetic energy between mostly metallic drawer rails. Those rolling bodies are supported rotatably in a carriage cage arranged between rails and in the closed condition of the drawer have to partially carry the static loading and upon movement guarantee that the drawer is pushed in and pulled out of the body of an article of furniture as easily and without problem as possible.

Rolling bodies in a carriage cage are to be found for example in WO 2008/046118 A2. A disadvantage with those one-piece rolling bodies for carriage cages is that they wear relatively quickly, they are flattened off under a static loading between metallic drawer rails and often have spalling phenomena which are due to the manufacturing process.

SUMMARY OF THE INVENTION

Therefore the object of the invention is to provide rolling bodies which are improved over the state of the art or an improved carriage cage. In particular the invention seeks to provide that the strength of the rolling bodies is increased, the flattening tendency is reduced, load support is improved and nonetheless there is a certain elasticity in the rolling body and a reduction in wear.

That is achieved for a rolling body and a carriage cage in that the rolling body has an inwardly disposed core portion and a separate casing portion surrounding the core portion. That two-part configuration of the rolling body according to the invention makes it possible to prevent the spalling phenomena which occur with the hitherto usual one-part manufacture as the individual components can now be more easily produced in a shrinkage-free and shrink hole-free fashion. In addition there is the possibility of the individual components, core portion and casing portion being designed to suit the specific factors involved in the carriage cage.

Accordingly, in a preferred embodiment of the invention, it is provided that the core portion and the casing portion comprise mutually different materials like plastic and steel. In that way the loading can be ideally transmitted by the materials of the rolling bodies without causing unnecessary wear.

Alternatively, it is also possible for the core portion and the casing portion to comprise the same but separately provided plastic. Preferably however it can be provided that the core portion and the casing portion comprise different types of plastic, depending on the respective loading and the magnitude of the flattening tendency.

Particularly preferable for that purpose, it can be provided that the plastics of the core portion and the casing portion have different ball indentation hardnesses. Those rolling body components which involve different ball indentation hardnesses provide for a substantial improvement in the properties of the carriage overall and implement a drawer guide which is more easily movable and suffers less wear in comparison with the state of the art.

In general in the case of rollers which are not of the general kind set forth herein (see AT 317 473, DE 41 08 884 A1, DE 41 04 271 A1, DE 26 02 979, DE 24 61 341 and DE 39 22 716 A1), there is admittedly a two-part structure, but these cannot be used in any way in carriage cages due to their size and their manner of mounting. In addition those large rollers which are known from the state of the art do not have a core portion which does not have any spindle and which is substantially in the form of a solid cylinder and for that reason also inter alia they cannot be used in carriage cages. In addition those rollers of a different general kind are always part of a drawer guide, as individual, highly loaded rollers, whereas the rolling bodies according to the invention are mostly arranged in conjunction with a plurality of rolling bodies in the carriage cage. Accordingly, changes in the nature thereof (two-part configuration) act in a quite different fashion on the running and extension characteristics of a drawer, as for example the flattening tendencies and load support are distributed to many rolling bodies in the composite assembly.

As according to a preferred embodiment of this invention the core portion is substantially in the form of a solid cylinder, it is possible to achieve a substantial improvement in quality insofar as in particular the core portion is produced in the form of a compact plastic portion without an opening or a hole having to be left free for a spindle pin—which is necessary in the state of the art of a different general kind. In the state of the art of the different general kind, the core portions are always in the form of hollow cylinders and not in the form of solid cylinders and for that reason in a preferred rolling body of this invention the core portion extends from the radially inwardly disposed surface of the casing portion (that is to say within the casing portion), to the notional axis of the rolling body. That compact nature of the core portion provides in particular for better stability of the overall rolling body as the compact core portion is exposed to fewer crushing and squashing effects or can better carry them than an annular core portion which has a stability-reducing axial opening.

In a preferred embodiment of this invention it can be provided that the core portion has a higher ball indentation hardness than the casing portion, wherein the first plastic has a ball indentation hardness above 125 N/mm$^2$, preferably above 140 N/mm$^2$, and the second plastic has a ball indentation hardness below 105 N/mm$^2$, preferably below 90 N/mm$^2$. With such a rolling body which is so-to-speak internally hard and externally soft, the casing can remain substantially non-reinforced, while in the case of the reinforced core the properties that are useful are that there is a reduction in wear, an increase in strength, and a reduction in creep of the plastic in the closed condition under a static loading.

In an alternative embodiment of the present invention it can be provided that the casing portion has a higher ball indentation hardness than the core portion, wherein the second plastic has a ball indentation hardness above 125 N/mm$^2$, preferably above 140 N/mm$^2$, and the first plastic has a ball indentation hardness below 105 N/mm$^2$, preferably below 90 N/mm$^2$. With such a rolling body having a reinforced casing portion and a relatively soft core (externally hard, internally soft), there are the positive properties of a substantial reduction in flattening, load support in respect of the casing and an increase in the elasticity of the rolling body.

For the different types of plastic it can preferably be provided that one of the plastics is polyoxymethylene (POM) with a ball indentation hardness of between 150 and 170 N/mm$^2$ and one of the plastics is a polyamide, preferably PA6, with a ball indentation hardness of between 65 and 80 N/mm$^2$. Thus those two types of plastic can be used in the carriage cage at different locations depending on the respective purpose of use and kind of loading on the rolling body.

Additional differences which form important criteria for use of those plastics as rolling bodies are listed hereinafter:

|  | POM | PA6 |
|---|---|---|
| E-modulus | 2800-3200 N/mm$^2$ | 1400-3200 N/mm$^2$ |
| Density | 1.41-1.43 g/cm$^3$ | 1.13-1.14 g/cm$^3$ |
| Elongation at break | 45-70% | 40-150% |
| Breaking strain or yield stress | 70-80 N/mm$^2$ | 45-65 N/mm$^2$ |

The ball indentation hardness (also referred to as the ball impression hardness) substantially determines the visco-elastic deformation component of the plastics. If during hardness testing of the plastic an indentation body used in the testing process is relieved of load the elastic component of the deformation goes back instantly and the visco-elastic component then goes back gradually. Therefore the indentation body is loaded over a certain period of time during hardness measurement on plastics and then under load the total elastic and visco-elastic indentation depth is measured. A ball indentation test which can be used for determining those parameters should be based on DIN EN ISO 2039-1.

In a preferred embodiment of the invention it can be provided that the rolling body is produced in a two-component injection molding process. The spalling effects which have hitherto often occurred can be avoided by that manufacturing process as upon injection molding of the two components they remain substantially shrinkage-free and shrink hole-free, wherein those shrinkage phenomena otherwise subsequently cause those spalling effects. Due to the casing portion being shrunk on to the core portion an intimate join is also achieved between the two component parts of the rolling body. The possibility should not be ruled out that, for example, the core portion itself is produced in such a preferred two-component injection molding process. Alternatively, the possibility should also not be ruled out that the two plastic components are extruded and cut to length for a given rolling body width after the extrusion operation. As a further alternative the two components of the rolling body can also be assembled only upon fitment of the carriage cage in the drawer guide.

To achieve rotatability and guidance for the rolling bodies in the carriage cage by virtue of the rolling bodies not having any spindle member, it can preferably be provided that the rolling body has two ends, wherein raised guide portions or guide recesses are provided in the ends, and wherein the raised guide portions or guide recesses project away from the rolling body or extend into the rolling body in the direction of the axis, less than 20%, preferably less than 10%, of the width of the rolling body.

As the rolling bodies according to the invention generally also have to carry very high loads during the movement of the drawer, it is preferably provided that the width of the rolling body can be greater than the diameter thereof. In that case the ratio of the width of the rolling body to the diameter of the rolling body can be between 1.01 to 1 and 1.8 to 1, preferably between 1.05 to 1 and 1.35 to 1. Alternatively, the possibility should not be ruled out that the width of the rolling body is less than the diameter thereof. That can be appropriate in particular when two or more such rolling bodies are arranged in coaxially successive relationship in the carriage cage.

Preferred dimensions of a rolling body according to the invention have the diameter of the rolling body between 1 and 8 mm, preferably between 3.5 and 6.5 mm, and the thickness of the casing portion transversely to the axis of the rolling body between 0.1 and 2.5 mm, preferably between 0.2 and 0.5 mm.

A preferred embodiment of this invention can provide that a reinforcing layer of glass fiber is arranged in the rolling body. In addition, the possibility should not be ruled out that, in spite of the advantages already set forth for a core portion in the form of a solid cylinder, nonetheless a narrow spindle or shaft portion is provided in the rolling body.

In a preferred embodiment of a carriage cage according to the invention it can be provided that all rolling bodies rotatably supported in the carriage cage have a core portion comprising a first plastic and a casing portion comprising a second plastic, wherein the plastics of the core portion and the casing portion are of different ball indentation hardnesses. Depending on the respective location of use and load range, the individual rolling bodies may have mutually different plastics with different ball indentation hardnesses or different types of plastic. Generally the same preferred variants also apply to the carriage cage, as to the rolling body.

It can further preferably be provided that raised guide portions or guide recesses are provided at the ends in the rolling bodies and that the carriage cage has a housing with receiving spaces for the rolling bodies, wherein the housing has in the receiving spaces holding depressions or holding projections at which the rolling bodies are rotatably supported and held by way of the raised guide portions or guide recesses.

BRIEF DESCRIPTION OF THE DRAWINGS

Further details and advantages of the present invention are described more fully hereinafter by means of the specific description with reference to the embodiments and by way of examples illustrated in the drawings, in which.

DETAILED DESCRIPTION OF THE PREFERRED EMBODIMENTS

Figure 1:
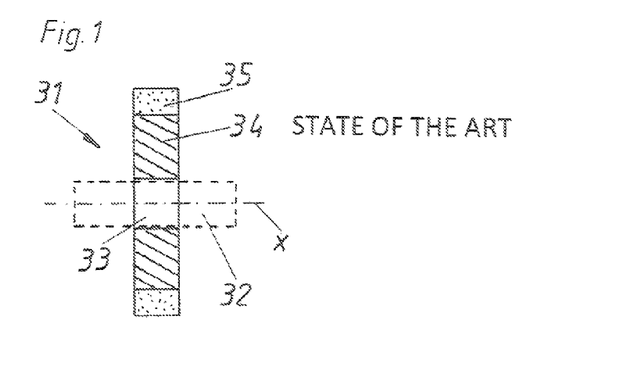
FIG. 1 shows a longitudinal section through a roller according to the state of the art.

FIG. 1 shows a relatively large roller 31 (of about 1.5 cm in diameter) in accordance with the state of the art, as can serve for example as a single guide roller for a drawer rail in a body rail. In that respect it is already known for a casing portion 35 and a core portion 34 to be made from different plastics. What is complicated and expensive in those rollers 31 according to the state of the art is inter alia that a spindle opening 33 always has to be provided for a spindle pin 32, by way of which the roller is rollably mounted for example on the drawer rail.

Figure 2:
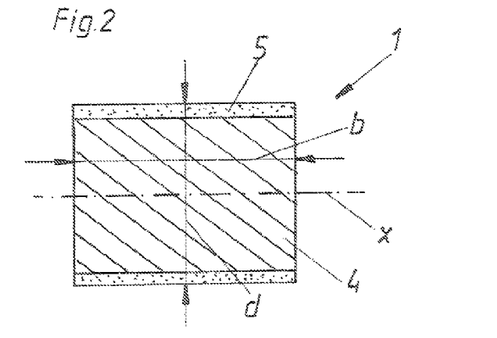
FIG. 2 shows a longitudinal section through a rolling body according to the invention.

In comparison, FIG. 2 shows how an embodiment of a rolling body 1 according to the invention has a compact, spindle-less core portion 4 in the form of a solid cylinder which comprises a casing portion 5 which differs from the core portion 4 and which is of a different ball indentation hardness. The preferred two-component injection molding manner of manufacture of such a rolling body 1 (and/or only the core portion 4) affords a substantial increase in quality as there are no shrinkage holes or cavities (air inclusions). In that respect, for example, an inner core portion 4 of a diameter d of between about 1.5 and 4 mm can be injected in a first step. Then in a second step the inner core portion 4 has an outer core portion 4 of the same material injected therearound, to give an overall diameter of between about 3 and 7 mm. That provides for an increase in the service life and an increase in the strength of the two-component core portion 4 and/or the two-component rolling body 1. The thickness of the core portion 4 in comparison with the casing portion 5 can vary considerably in comparison with the embodiment in FIG. 2. What is essential for functionality is that the width b of the rolling body 1, measured in the direction of the axis x, is greater than the diameter d of the rolling body 1.

Figure 3:
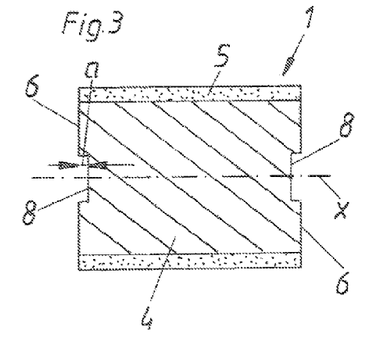
FIG. 3 shows a longitudinal section through a rolling body with guide recess.
Figure 4:
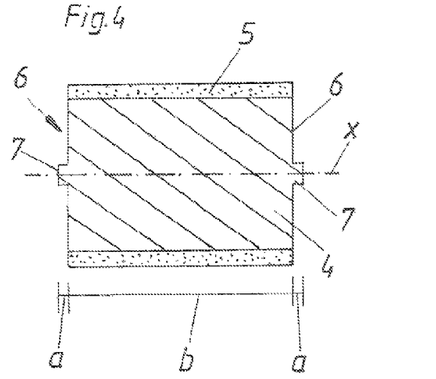
FIG. 4 shows a longitudinal section through a rolling body with raised guide portion.

FIGS. 3 and 4 show mutually alternative embodiments of a rolling body 1, wherein on the one hand a guide recess 8 with a recess depth a can serve as part of a holding or guide device for the rolling body 1 on a carriage cage 2, while on the other hand, in a correspondingly reversed configuration, a raised guide portion 7 of a raised height dimension a can be provided on the rolling body 1. The line X shown in FIGS. 3 and 4 designates the axis about which the rolling body 1 rotates, and an axle shaft unitary with the core portion 4 is made of the material of the core portion 4.

Figure 5:
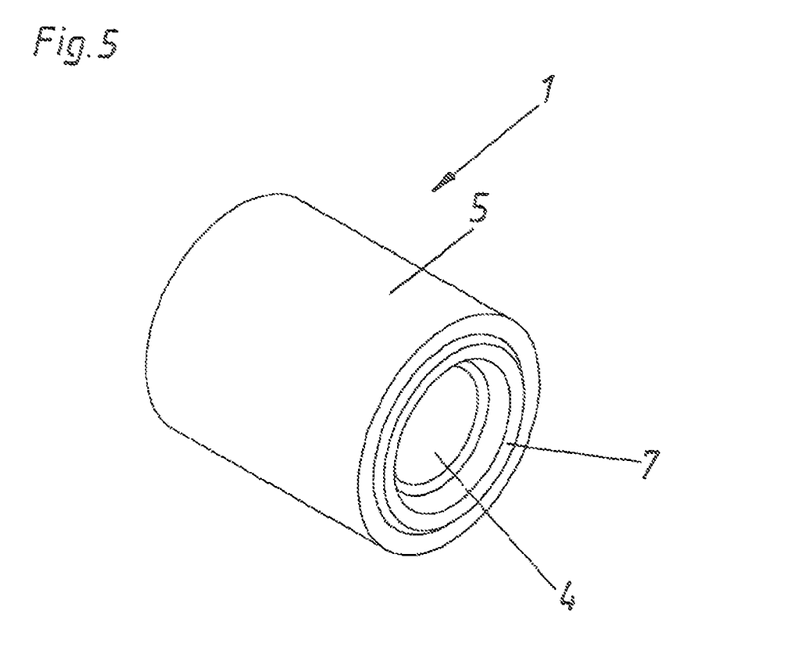
FIG. 5 shows a perspective view of a rolling body.

FIG. 5 shows a perspective view of a rolling body 1, wherein provided in the region of the core portion 4 is a guide recess 8 surrounded by a substantially circular raised guide portion 7. That raised guide portion 7 has inclined flanks, which makes it easier for the rolling body 1 to be introduced into a receiving space 10 which is provided in a carriage cage 2 and which has a holding projection 12 (see e.g. FIG. 7).

Figure 6:
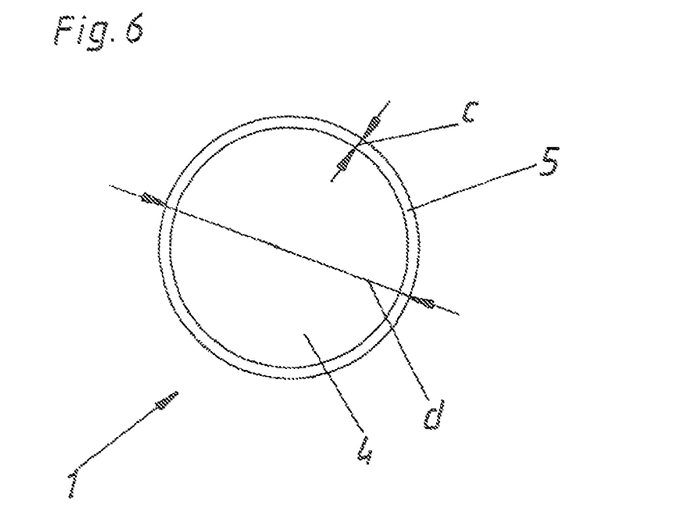
FIG. 6 shows a cross-section through the rolling body.

FIG. 6 shows a cross-section through a rolling body 1, wherein the casing portion thickness c can preferably be between 0.1 and 0.7 mm.

Figures 7, 8:
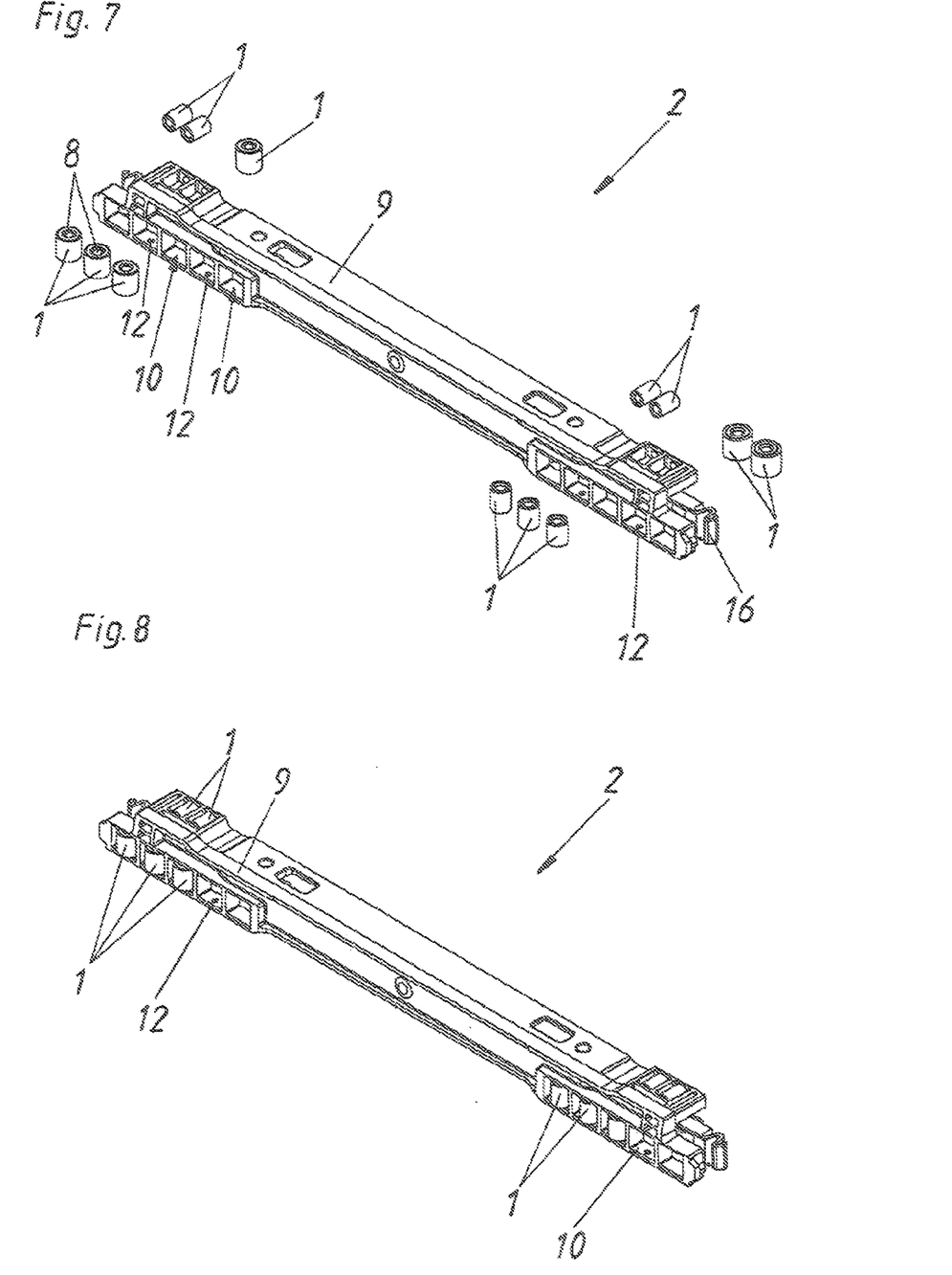
FIG. 7 shows an exploded view of a carriage cage.
FIG. 8 shows a carriage cage with fitted rolling bodies.

FIG. 7 shows an exploded view of a carriage cage 2 which as essential parts has a housing 9 which preferably comprises plastic and is injection molded, and a plurality of rolling bodies 1. Provided in the housing 9 at various locations are receiving spaces 10 for the rolling bodies 1, wherein projecting into those receiving spaces 10 are holding projections 12 by way of which the rolling bodies 1 are held by way of the recesses 8. In that respect those holding projections 12 substantially only serve to prevent the rolling bodies 1, which are only loosely introduced into the receiving spaces 10, from falling out upon assembly of the drawer guide. Carriage dampers 16 can be arranged at the ends of the carriage cage 2. The rolling bodies 1 are arranged in the receiving spaces 10 in FIG. 8.

Figure 9:
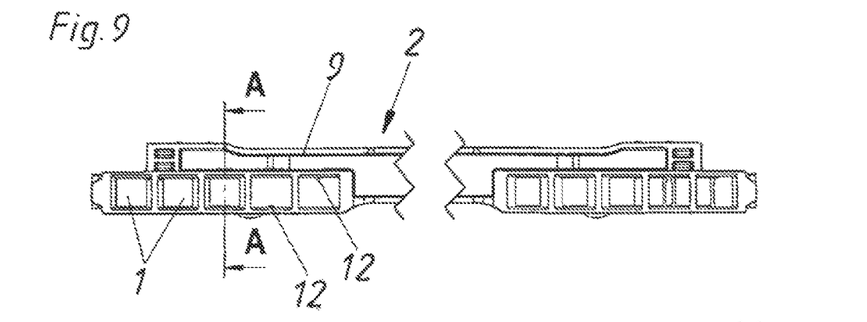
FIG. 9 shows a carriage cage and FIG. 9A shows a section A-A of FIG. 9.
Figure 9A:
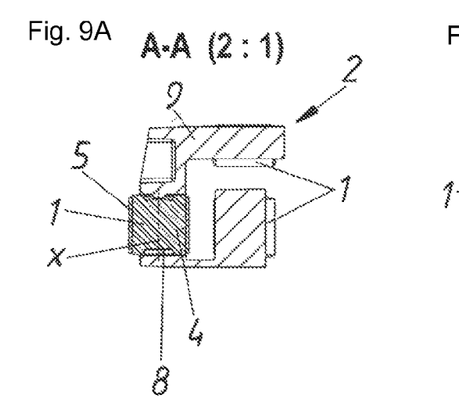
Figure 10:
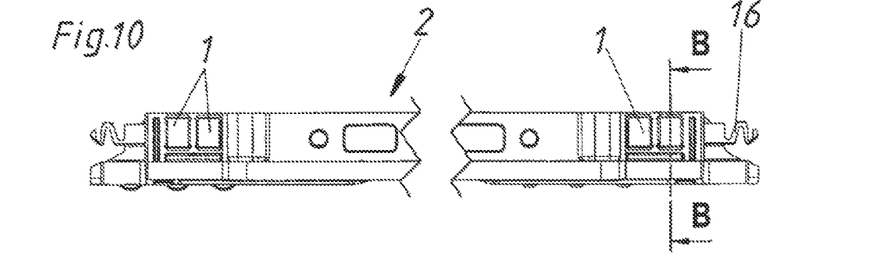
FIG. 10 shows a carriage cage and FIG. 10A shows a section B-B of FIG. 10.
Figure 10A:
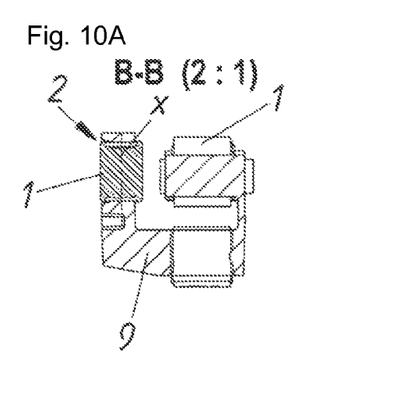
Figure 11:
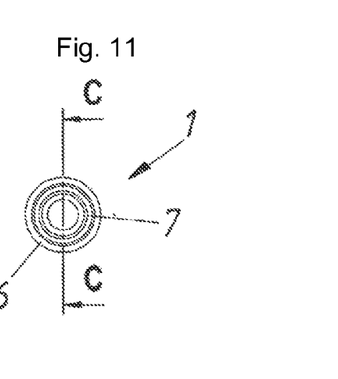
FIG. 11 shows a rolling body and FIG. 11A shows a section C-C of FIG. 11.
Figure 11A:
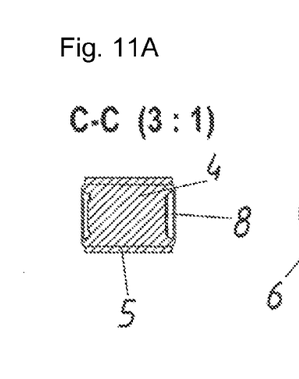

FIG. 9 shows a side view of a carriage cage 2 and FIG. 9A a section A-A, wherein it is possible to see how a plurality of rolling bodies 1 are held in the housing 9 of the carriage cage 2 by way of holding projections 12 or guide recesses 8, respectively. FIG. 10 shows a plan view of the carriage cage 2 and FIG. 10A a section B-B. FIG. 11 shows a view on to the end 6 of a rolling body 1, wherein FIG. 11A is a section C-C which shows the two-component nature (core portion 4 and casing portion 5) of the rolling body 1.

Figure 12:
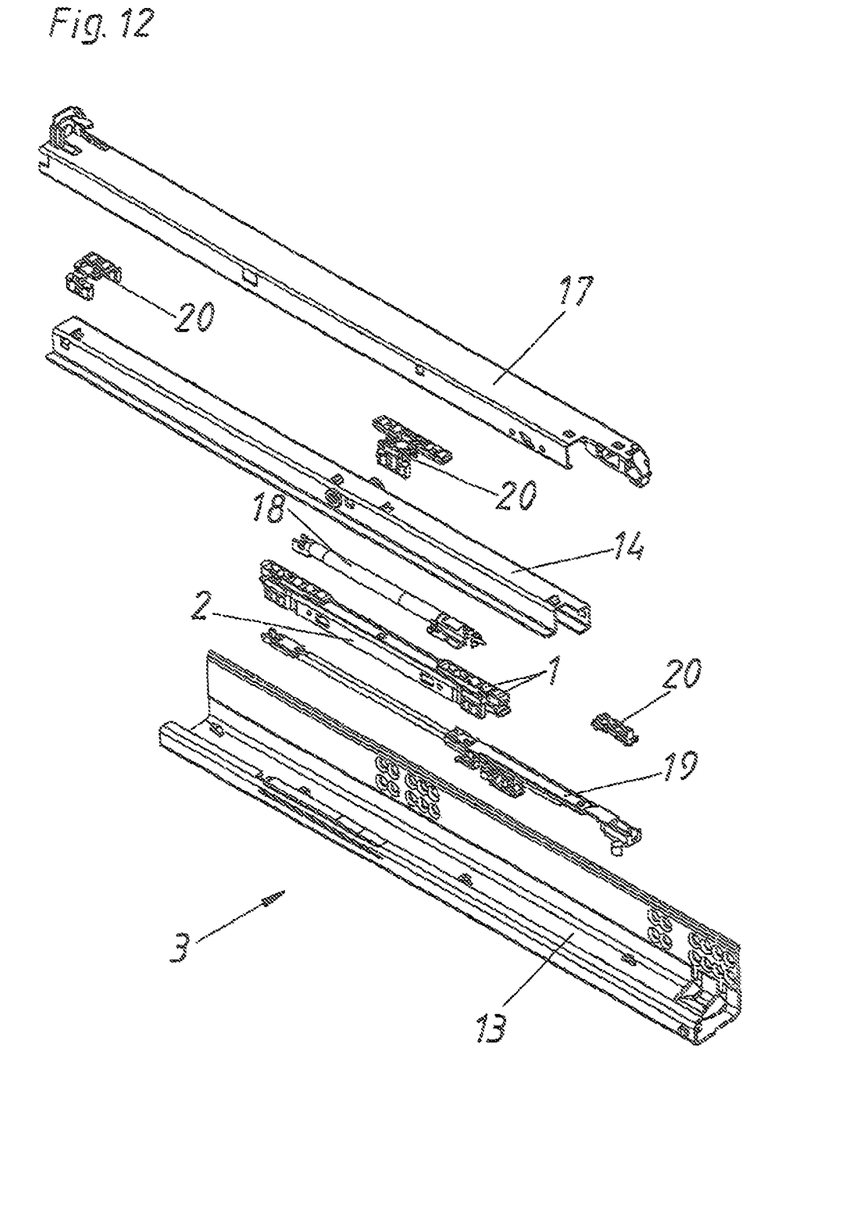
FIG. 12 shows an exploded view of a drawer guide.
Figure 13:
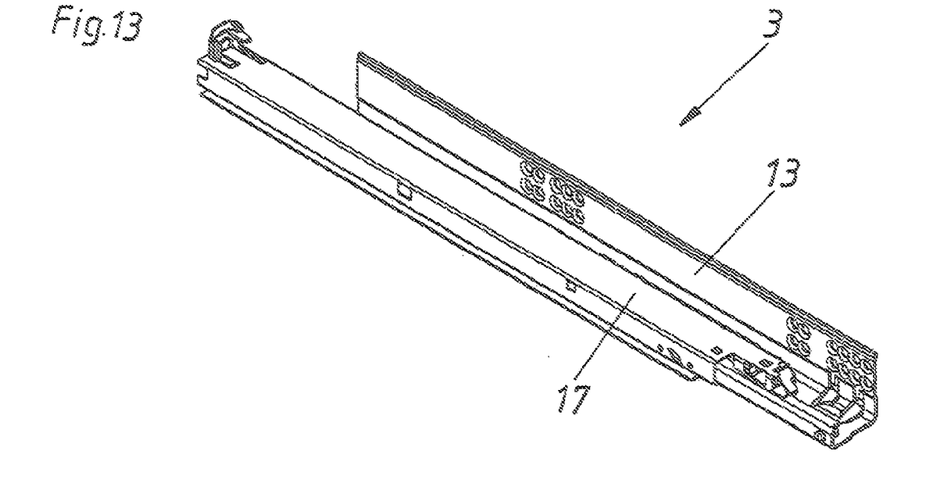
FIG. 13 shows an assembled drawer guide.

FIG. 12 is an exploded view showing the essential component parts of the drawer guide 3 comprising a rail member 13 in the form of a body rail, a rail member 14 in the form of a central rail, a drawer rail 17 and a carriage cage 2 with rolling bodies 1 that is arranged between the body rail 13 and the central rail 14. The drawer guide 3 can also have an ejection device 19, a retraction device 18 and various further elements 20. The component parts of FIG. 12 are shown in the assembled condition in FIG. 13.

Figure 14:
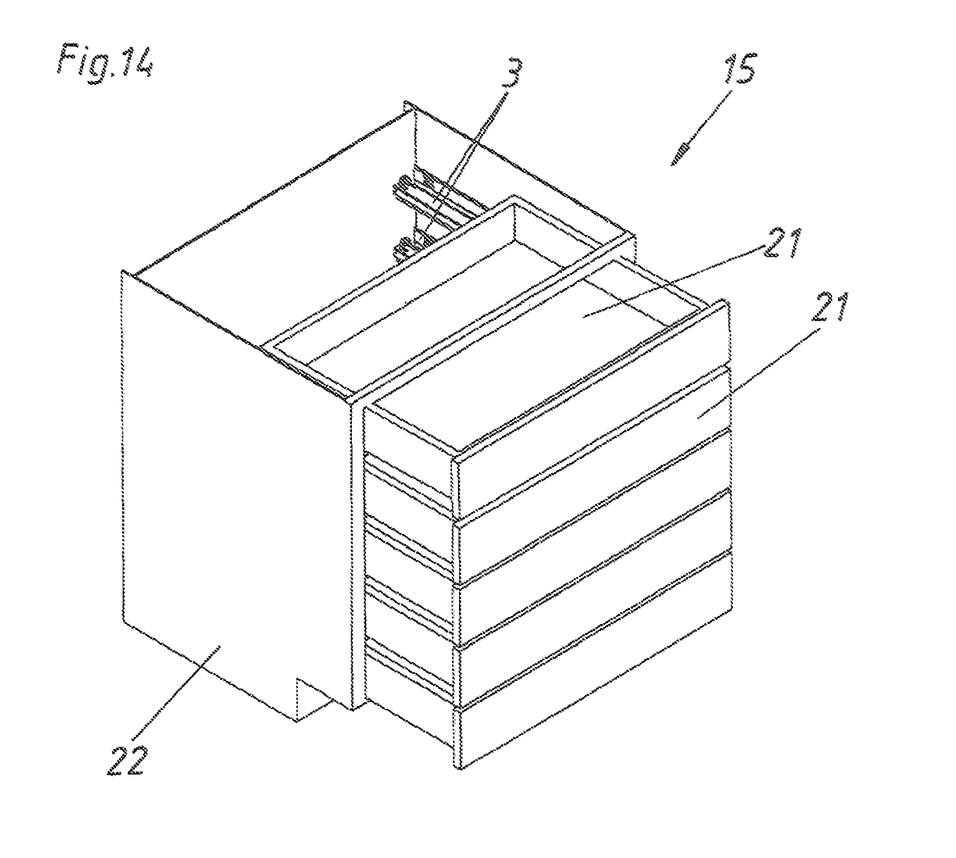
FIG. 14 shows an article of furniture with drawers guided on drawer guides.

Finally, FIG. 14 shows an article of furniture 15 comprising a plurality of drawers 21 which can be moved in and out in a furniture body 22 by way of drawer guides 3 according to the invention.

The invention claimed is:

1. A rolling body of a carriage cage for drawer guides, said rolling body consisting of two layers, including a first layer which is an inwardly disposed core portion and a second layer which is a casing portion surrounding said core portion, wherein said first layer and said second layer are rotatably fixed with respect to each other, wherein said core portion is entirely made of a first material and said casing portion is of a second material different from said first material, wherein each of said first material and said second material is selected from the group consisting of plastic and steel, and wherein said core portion comprises an axle shaft that is unitary with said core portion and that is made of said first material of said core portion.

2. The rolling body of claim 1, wherein said first material and said second material are both plastic materials that have different ball indentation hardnesses.

3. The rolling body of claim 1, wherein said core portion is substantially in the form of a solid cylinder.

4. The rolling body of claim 1, wherein said core portion extends to and includes a notional axis of said rolling body.

5. The rolling body of claim 2, wherein said core portion has a higher ball indentation hardness than said casing portion, wherein said first material has a ball indentation hardness above 125 N/mm$^2$ and said second material has a ball indentation hardness below 105N/mm$^2$.

6. The rolling body of claim 2, wherein said core portion has a higher ball indentation hardness than said casing portion and wherein said first material has a ball indentation hardness above 140 N/mm$^2$.

7. The rolling body of claim 2, wherein said core portion has a higher ball indentation hardness than said casing portion and wherein said second material has a ball indentation hardness below 90 N/mm$^2$.

8. The rolling body of claim 2, wherein said casing portion has a higher ball indentation hardness than said core portion, wherein said second material has a ball indentation hardness above 125 N/mm$^2$ and said first material has a ball indentation hardness below 105 N/mm$^2$.

9. The rolling body of claim 2, wherein said casing portion has a higher ball indentation hardness than said core portion and wherein said second material has a ball indentation hardness above 140 N/mm$^2$.

10. The rolling body of claim 2, wherein said casing portion has a higher ball indentation hardness than said core portion and wherein said first material has a ball indentation hardness below 90 N/mm$^2$.

11. The rolling body of claim 1, wherein said rolling body is produced in a two-component injection molding process.

12. The rolling body of claim 1, wherein said rolling body is wider than its diameter.

13. The rolling body of claim 12, wherein a ratio of the width of said rolling body to the diameter of said rolling body is between 1.01/1 and 1.8/1.

14. The rolling body of claim 12, wherein a ratio of the width of said rolling body to the diameter of said rolling body is between 1.05/1 and 1.35/1.

15. The rolling body of claim 1, wherein said rolling body has a diameter between 1.5 and 8 mm and said casing portion has a thickness in a direction transverse to an axis of said rolling body between 0.2 and 2.5 mm.

16. The rolling body of claim 1, wherein said rolling body has a diameter between 3.5 and 6.5 mm and said casing portion has a thickness in a direction transverse to an axis of said rolling body between 0.2 and 2.5 mm.

17. A carriage cage for a drawer guide in which a plurality of rolling bodies are supported rotatably in said carriage cage, wherein at least one rolling body of said plurality of rolling bodies is a rolling body as defined by claim 1.

18. The carriage cage of claim 17, wherein said first material and said second material of said at least one rolling body are both plastic materials that have different ball indentation hardnesses.

19. The carriage cage of claim 17, wherein each rolling body of said plurality of rolling bodies is a rolling body as defined by claim 1, wherein said first material and said second material of each said rolling body are both plastic materials that have different ball indentation hardnesses.

20. The carriage cage of claim 17, wherein said rolling bodies have ends provided with raised guide portions or guide recesses and said carriage cage has a housing with receiving spaces for said rolling bodies, wherein said housing has, in said receiving spaces, holding depressions or holding projections at which said rolling bodies are rotatably supported and held by way of said raised guide portions or guide recesses.

21. A drawer guide having mutually movable rail portions and a carriage cage according to claim 17, wherein said carriage cage is arranged between said mutually movable rail portions.

22. An article of furniture having a drawer guide according to claim 21.

* * * * *